J. A. & L. F. MUSTEE.
VEHICLE SPRING LUBRICATOR.
APPLICATION FILED NOV. 19, 1914.
1,159,982.
Patented Nov. 9, 1915.
2 SHEETS—SHEET 1.
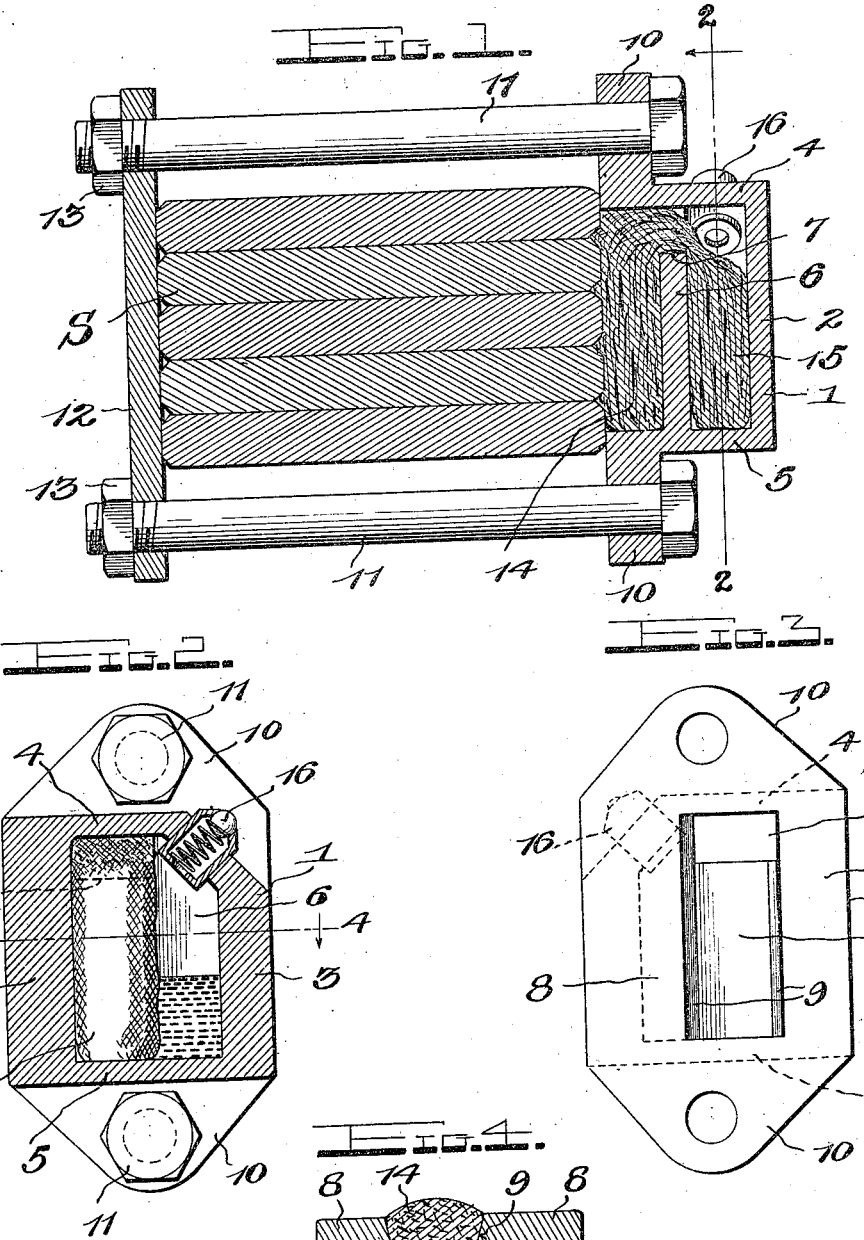
Witnesses
Chas. L. Grieshauer.
J. R. Pirce
Inventors
J. A. Mustee and
L. F. Mustee,
By H. R. Willson & Co
Attorneys

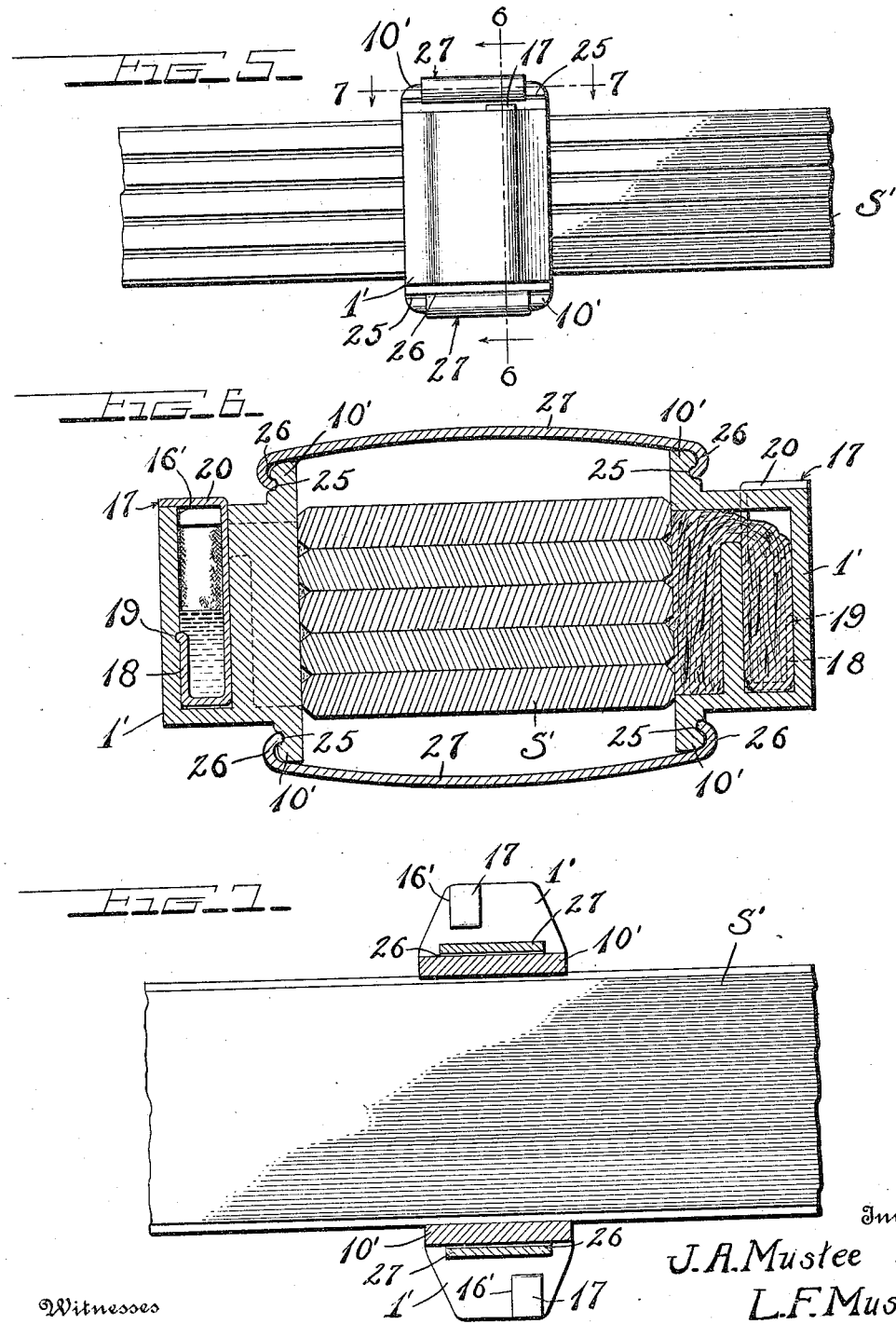

UNITED STATES PATENT OFFICE.

JOSEPH A. MUSTEE AND LAWRENCE F. MUSTEE, OF CLEVELAND, OHIO.

VEHICLE SPRING-LUBRICATOR.

1,159,982.  Specification of Letters Patent.  Patented Nov. 9, 1915.

Application filed November 19, 1914. Serial No. 873,036.

*To all whom it may concern:*

Be it known that we, JOSEPH A. MUSTEE and LAWRENCE F. MUSTEE, citizens of the United States, residing at Cleveland, in the county of Cuyahoga and State of Ohio, have invented certain new and useful Improvements in Vehicle Spring-Lubricators; and we do declare the following to be a full, clear, and exact description of the invention, such as will enable others skilled in the art to which it appertains to make and use the same.

Our invention relates broadly to lubricating devices and more particularly to those designed for use in connection with the leaf springs employed upon automobiles and other vehicles.

The main object of the invention is to provide a lubricating pad to be positioned in contact with one edge of a sectional leaf spring and to provide an absorbent feed member for said pad whereby oil may be fed to the latter by capillary attraction.

In carrying out the above end, the device aims to provide extremely simple construction for providing an oil reservoir, a retainer for the pad and a clamp whereby the device may be secured in position upon a spring.

With the above and minor objects in view, the invention resides in certain novel features of construction and combination herein described and claimed and shown in the drawings wherein;

Figure 1 is a transverse section through a sectional vehicle spring and our lubricator applied thereto; Fig. 2 is a vertical section taken on the line 2—2 of Fig. 1, the device being removed from the spring; Fig. 3 is a rear view; Fig. 4 is a horizontal section as seen on the line 4—4 of Fig. 2; Fig. 5 is a side elevation of a portion of a vehicle spring showing a modified form of oiler connected thereto; Fig. 6 is a vertical transverse section as seen on the line 6—6 of Fig. 5; and, Fig. 7 is a detail horizontal section taken on the line 7—7 of Fig. 5.

In the accompanying drawings, from Figs. 1 to 4 inclusive, the numeral 1 designates a substantially rectangular oil reservoir whose front wall 2, side walls 3, and top and bottom walls 4 and 5 are of solid construction while the rear wall 6 of said reservoir is provided with an opening 7 near one of its upper corners. Formed on the opposite upright edges of the rear wall 6, is a pair of upright ribs 8 whose inner parallel walls diverge outwardly as indicated at 9, the opposite ends of said ribs 8 being integrally connected with upper and lower attaching ears 10 which are likewise formed integrally with the upper and lower walls 4 and 5 of the reservoir 1, said ears having openings receiving clamping bolts 11 which straddle the vehicle spring S, the opposite ends of the bolts being passed through openings in an upright clamping plate 12 and being equipped with clamping nuts 13. When the device is thus clamped upon the springs S, the ribs 8 are designed to contact with one edge thereof. With the parts positioned as previously set forth, a lubricating pad 14 having its intermediate portion bulged outwardly as seen in Fig. 4, is positioned in contact with the rear wall 6 and located between the ribs 8, said pad thereby contacting with the edges of the various leaves of which the spring S is constructed, as clearly seen in Fig. 1, an absorbent feed member 15 being provided for the purpose of furnishing oil to said pad by capillary attraction, said member 15 leading from the interior of the reservoir 1 through the opening 7 and to the pad 14. The reservoir may be filled with oil through any suitable opening, but a normally closed ball valve 16 is preferably employed for this purpose, said valve being positioned as seen in the drawings or at any other appropriate point.

From Figs. 5 to 7, inclusive, a vehicle spring S' is shown with the opposite edges of which, a pair of lubricating reservoirs 1' contact, said reservoirs being constructed in identically the same manner as those previously described with the exception that the ball valves 16 are replaced by rectangular openings 16' through which leaf springs 17 depend, the lower ends of said springs being bent upwardly as at 18 and thence outwardly at 19 into grooves formed in the inner sides of the outer walls of said reservoirs. It will be seen by reference to Fig. 6, that this construction causes the bodies of the springs 17 to contact with the walls of the reservoirs opposite the outer walls thereof, and that the extreme upper ends of said springs are bent outwardly at 20 to normally cover the openings 16', thereby preventing the entrance of dust and dirt. By the use of a suitable tool, however, the springs may be raised a sufficient amount to allow oil to be fed into the reservoirs.

For the purpose of securing the reservoirs 1' in position upon the spring S', said reservoirs are provided with ears 10' which depend from their lower ends and rise from their upper ends, said ears having transverse grooves 25 in which the inwardly turned ends 26 of flat leaf springs 27 are removably seated, said springs 27 projecting transversely across the upper and lower sides of the spring S' as shown. By so connecting the reservoirs to the springs, the various leaves of the latter are allowed to move more readily than when the device is applied as shown in the first figure of the drawings. It will be understood that the reservoirs 1' may be easily removed by springing one end of one of the springs 27 out of its co-acting groove 25.

From the foregoing description, taken in connection with the accompanying drawings, it will be seen that a comparatively simple device has been provided for carrying out the objects of the invention, and that the various leaves of vehicle springs will be sufficiently lubricated to prevent the existence of friction between the same. Due to the construction of the feed member, however, the quantity of oil delivered from the pad 14 will be insufficient to collect in quantities upon the edges of the spring.

Having thus described our invention, what we claim as new and desire to secure by U. S. Letters Patent is:

1. A vehicle spring lubricator comprising an oil reservoir having upright side walls, one of said side walls having a horizontal groove formed therein, said reservoir having an opening in its top, a closing member in the form of a leaf spring adapted to normally cover said opening, the lower end of said spring being outturned to rest in said groove to hold the closing member in position, and means whereby the lubricator may be secured in position upon one edge of the vehicle spring.

2. A vehicle spring lubricator comprising an oil reservoir having a pair of parallel ribs on one of its sides and an opening through said side and located between said ribs, a lubricating pad interposed between said ribs, an absorbent feed member leading from said pad through the opening and into the oil reservoir and means whereby the latter may be secured in position upon a leaf spring with the pad contacting with one edge thereof.

3. A vehicle spring lubricator comprising an oil reservoir having a pair of parallel ribs on one side and an opening leading from the space between said ribs into the reservoir, the inner faces of said ribs diverging outwardly, a lubricating pad interposed between the two ribs, an absorbent feed member leading from said pad through the opening and into the oil reservoir, and means whereby the latter may be secured in position upon a leaf spring with the pad contacting with one edge thereof.

4. A vehicle spring lubricator comprising an upright substantially rectangular oil reservoir, a pair of upright parallel ribs formed integrally with the rear side wall of said reservoir, said wall being provided with an opening leading from the space between said ribs into the interior of the reservoir, upper and lower attaching ears formed integrally with the upper and lower ends of the reservoir and likewise formed integrally with the upper and lower ends of said ribs, a lubricating pad located in the space between the attaching ears and said ribs, and an absorbent feed member leading from said pad through the opening and into the oil reservoir.

5. The combination with a vehicle spring comprising a plurality of leaves, of lubricating devices contacting with the opposite edges of the spring, and each having upper and lower extensions provided with grooves in their outer faces, and transverse leaf springs above and below the vehicle spring and having inwardly curved ends removably seated in the grooves of said extensions.

6. The combination with a vehicle spring comprising a plurality of leaves, of a lubricating device contacting with one edge of the spring, and upper and lower springs for holding said device in contact with the spring.

7. The combination with a vehicle spring comprising a plurality of leaves, of lubricating devices contacting with the opposite edges of the spring, and transverse springs extending above and below the vehicle spring and connected to the lubricating devices, whereby the latter are yieldingly retained in position.

In testimony whereof we have hereunto set our hands in presence of two subscribing witnesses.

JOSEPH A. MUSTEE.
LAWRENCE F. MUSTEE.

Witnesses:
CHAS. F. THIE, Jr.,
L. P. WITTE.

Copies of this patent may be obtained for five cents each, by addressing the "Commissioner of Patents, Washington, D. C."